United States Patent
Wang et al.

(10) Patent No.: US 7,878,048 B2
(45) Date of Patent: *Feb. 1, 2011

(54) FUEL SYSTEM INJECTION TIMING DIAGNOSTICS BY ANALYZING CYLINDER PRESSURE SIGNAL

(75) Inventors: Yue-Yun Wang, Troy, MI (US); Ibrahim Haskara, Macomb, MI (US); Chol-Bum M Kweon, Rochester, MI (US); Frederic Anton Matekunas, Troy, MI (US); Paul Anthony Battiston, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 295 days.

This patent is subject to a terminal disclaimer.

(21) Appl. No.: 12/139,735

(22) Filed: Jun. 16, 2008

(65) Prior Publication Data

US 2009/0312931 A1  Dec. 17, 2009

(51) Int. Cl.
*G01M 15/06* (2006.01)
(52) U.S. Cl. .................................................. 73/114.27
(58) Field of Classification Search ............. 73/114.02, 73/114.16, 114.17, 114.22, 114.27
See application file for complete search history.

(56) References Cited

U.S. PATENT DOCUMENTS

| | | | |
|---|---|---|---|
| 5,400,648 A * | 3/1995 | Mahr | 73/115.01 |
| 6,188,952 B1 * | 2/2001 | Serra et al. | 701/103 |
| 6,246,952 B1 * | 6/2001 | Honda | 701/111 |
| 7,133,761 B2 * | 11/2006 | Ancimer | 701/103 |
| 7,254,475 B1 * | 8/2007 | Grai et al. | 701/111 |
| 7,398,150 B2 * | 7/2008 | Shinozaki et al. | 701/114 |
| 7,467,040 B2 * | 12/2008 | Ker et al. | 701/102 |
| 7,467,041 B2 * | 12/2008 | Okubo et al. | 701/103 |
| 7,647,155 B2 * | 1/2010 | Shinozaki et al. | 701/102 |
| 7,657,359 B2 * | 2/2010 | Shinozaki et al. | 701/102 |
| 2002/0121267 A1 * | 9/2002 | Denz | 123/435 |
| 2003/0145829 A1 * | 8/2003 | Scholl et al. | 123/435 |
| 2005/0039721 A1 | 2/2005 | Truscott et al. | |
| 2008/0051975 A1 | 2/2008 | Ker et al. | |
| 2009/0132144 A1 * | 5/2009 | Shinozaki et al. | 701/102 |
| 2009/0259383 A1 * | 10/2009 | Wang et al. | 701/102 |
| 2009/0312932 A1 * | 12/2009 | Wang et al. | 701/102 |
| 2009/0312941 A1 * | 12/2009 | Wang et al. | 701/114 |

FOREIGN PATENT DOCUMENTS

WO  WO-2004048761 A1  6/2004
WO  WO-2005001263 A1  1/2005

* cited by examiner

*Primary Examiner*—Freddie Kirkland, III

(57) ABSTRACT

A method for diagnosing combustion within an engine includes monitoring pressure cylinder pressure and generating a measured combustion phasing value for the cylinder at a predetermined metric selected to index the combustion cycle. The measured combustion phasing value is calculated through a Fast Fourier Transform and compared to an expected combustion phasing value.

20 Claims, 4 Drawing Sheets

FUEL SYSTEM INJECTION TIMING DIAGNOSTICS BY ANALYZING CYLINDER PRESSURE SIGNAL

TECHNICAL FIELD

This disclosure relates to operation and control of internal combustion engines, including compression-ignition engines.

BACKGROUND

The statements in this section merely provide background information related to the present disclosure and may not constitute prior art.

Combustion timing or phasing is useful to diagnose issues in the combustion process. For a normal combustion process operated under a particular set of parameters, combustion phasing is predictable to within a small range. Combustion cycles deviating from this small range indicate that conditions within the combustion chamber are outside of the expected parameters. Analysis of combustion cycles may be performed in a number of ways.

Known methods to evaluate combustion phasing rely on estimating heat of combustion, the work performed by combustion, or other reactive metrics. These methods review historical data and react to trends or accumulated data points in the combustion data. However, compression-ignition engines and other engine control schemes operate over broad engine conditions. Effective and timely control, including fuel control, fuel tailoring, charge ignition timing control, exhaust gas recirculation (EGR) control, is necessary to meet operator demands for performance and fuel economy and comply with emissions requirements. Furthermore, there is much variability, including that related to: components, e.g., fuel injectors; systems, e.g., fuel line and pressures; operating conditions, e.g., ambient pressures and temperatures; and fuels, e.g., cetane number and alcohol content. The variability in combustion affects heat release and work output from individual cylinders, resulting in non-optimal performance of the engine. A measure of combustion variability based on real-time engine performance would be valuable to diagnose instability in the combustion process and provide information useful to reduce periods of inefficient or high emission operation.

Methods are known for processing complex or noisy signals and reducing them to useful information. One such method includes spectrum analysis through Fast Fourier Transforms (FFT). FFTs reduce a periodic or repeating signal into a sum of harmonic signals useful to transform the signal into the components of its frequency spectrum. Once the components of the signal have been identified, they may be analyzed and information may be taken from the signal.

Change in the engine performance may be apparent in cylinder pressures and pressure ratios. A variety of intrusive and non-intrusive pressure sensing means are known for sensing pressure within an internal combustion engine cylinder when the engine is motoring and when the engine is firing.

A system capable of transforming signals, such as pressure readings from a combustion chamber, containing information related to combustion into components describing combustion timing in real time would be useful to control sensitive engine control schemes and increase engine efficiency, fuel economy, and emissions control.

SUMMARY

An engine operative lean of stoichiometry and in a compression ignition range includes a cylinder having a variable volume combustion chamber defined by a piston reciprocating between top-dead-center and bottom-dead-center points and a cylinder head. A method for diagnosing combustion within the engine includes monitoring pressure from the cylinder during a combustion cycle and generating a measured combustion phasing value for the cylinder at a predetermined metric selected to index the combustion cycle based on a Fast Fourier Transform of the monitored pressure. The measured combustion phasing value is compared to an expected combustion phasing value based on a selected start of injection crank angle at the predetermined metric. Combustion phasing differences greater than an allowable combustion phasing difference are identified based on the comparison.

BRIEF DESCRIPTION OF THE DRAWINGS

One or more embodiments will now be described, by way of example, with reference to the accompanying drawings, in which.

DETAILED DESCRIPTION

Figure 1:
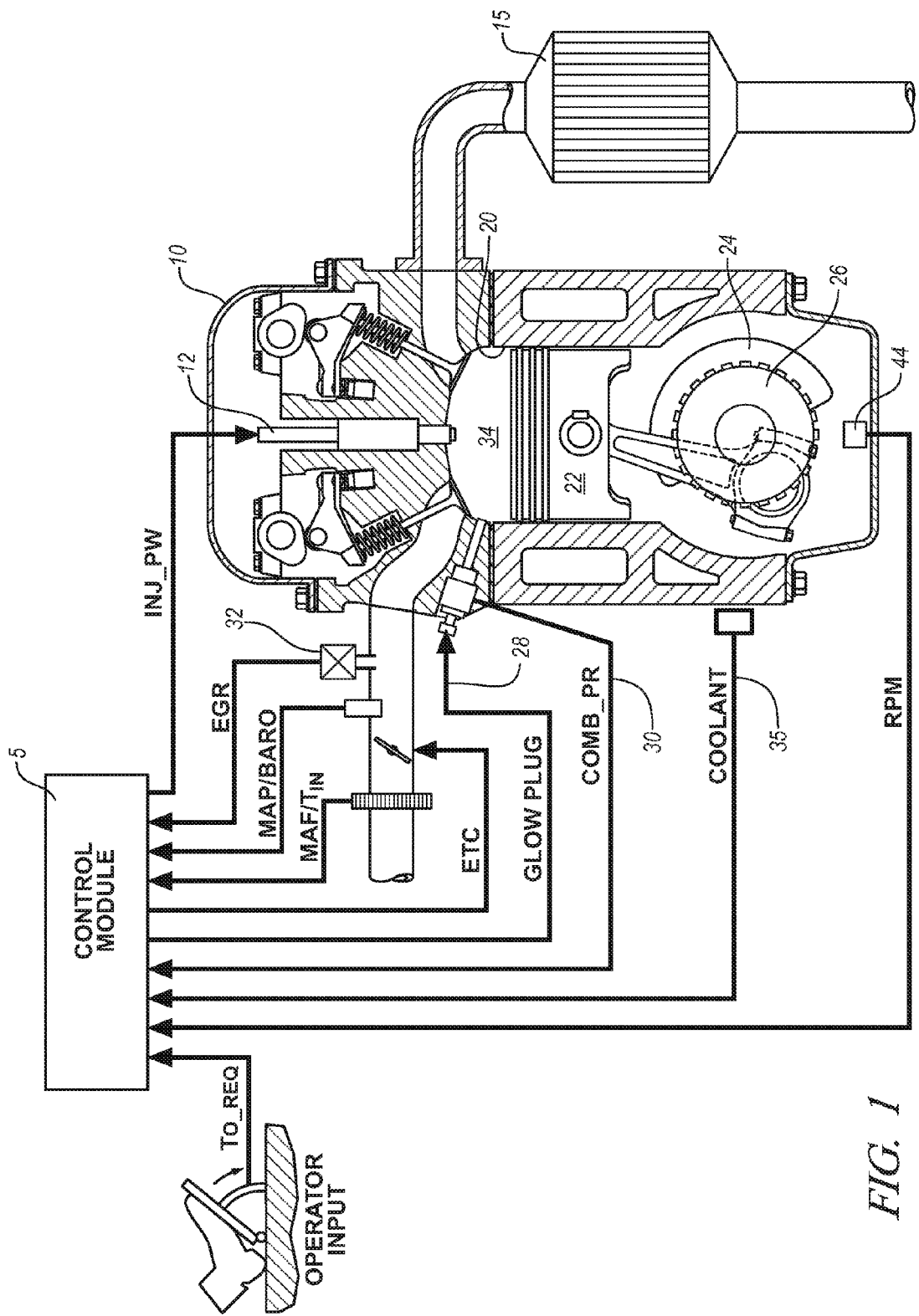
FIG. 1 is a sectional view of an internal combustion engine configured according to an exemplary embodiment of the disclosure.

Referring now to the drawings, wherein the showings are for the purpose of illustrating certain exemplary embodiments only and not for the purpose of limiting the same, FIG. 1 is a schematic diagram depicting an internal combustion engine 10, control module 5, and exhaust aftertreatment system 15, constructed in accordance with an embodiment of the disclosure. The exemplary engine comprises a multi-cylinder, direct-injection, compression-ignition internal combustion engine having reciprocating pistons 22 attached to a crankshaft 24 and movable in cylinders 20 which define variable volume combustion chambers 34. The crankshaft 24 is operably attached to a vehicle transmission and driveline to deliver tractive torque thereto, in response to an operator torque request ($T_{O\_REQ}$). The engine preferably employs a four-stroke operation wherein each engine combustion cycle comprises 720 degrees of angular rotation of crankshaft 24 divided into four 180-degree stages (intake-compression-expansion-exhaust), which are descriptive of reciprocating movement of the piston 22 in the engine cylinder 20. A multi-tooth target wheel 26 is attached to the crankshaft and rotates therewith. The engine includes sensing devices to monitor engine operation, and actuators which control engine operation. The sensing devices and actuators are signally or operatively connected to control module 5.

The engine preferably comprises a direct-injection, four-stroke, internal combustion engine including a variable volume combustion chamber defined by the piston reciprocating within the cylinder between top-dead-center and bottom-dead-center points and a cylinder head comprising an intake valve and an exhaust valve. The piston reciprocates in repetitive cycles each cycle comprising intake, compression, expansion, and exhaust strokes.

The engine preferably has an air/fuel operating regime that is primarily lean of stoichiometry. One having ordinary skill in the art understands that aspects of the invention are applicable to other engine configurations that operate primarily lean of stoichiometry, e.g., lean-burn spark-ignition engines. During normal operation of the compression-ignition engine, a combustion event occurs during each engine cycle when a fuel charge is injected into the combustion chamber to form, with the intake air, the cylinder charge. The charge is subsequently combusted by action of compression thereof during the compression stroke.

The engine is adapted to operate over a broad range of temperatures, cylinder charge (air, fuel, and EGR) and injection events. The methods described herein are particularly suited to operation with direct-injection compression-ignition engines operating lean of stoichiometry to determine parameters which correlate to heat release in each of the combustion chambers during ongoing operation. The methods are further applicable to other engine configurations, including spark-ignition engines, including those adapted to use homogeneous charge compression ignition (HCCI) strategies. The methods are applicable to systems utilizing multiple fuel injection events per cylinder per engine cycle, e.g., a system employing a pilot injection for fuel reforming, a main injection event for engine power, and, where applicable, a post-combustion fuel injection event for aftertreatment management, each which affects cylinder pressure.

Sensing devices are installed on or near the engine to monitor physical characteristics and generate signals which are correlatable to engine and ambient parameters. The sensing devices include a crankshaft rotation sensor, comprising a crank sensor 44 for monitoring crankshaft speed (RPM) through sensing edges on the teeth of the multi-tooth target wheel 26. The crank sensor is known, and may comprise, e.g., a Hall-effect sensor, an inductive sensor, or a magnetoresistive sensor. Signal output from the crank sensor 44 (RPM) is input to the control module 5. There is a combustion pressure sensor 30, comprising a pressure sensing device adapted to monitor in-cylinder pressure (COMB_PR). The combustion pressure sensor 30 preferably comprises a non-intrusive device comprising a force transducer having an annular cross-section that is adapted to be installed into the cylinder head at an opening for a glow-plug 28. The combustion pressure sensor 30 is installed in conjunction with the glow-plug 28, with combustion pressure mechanically transmitted through the glow-plug to the sensor 30. The output signal, COMB_PR, of the sensing element of sensor 30 is proportional to cylinder pressure. The sensing element of sensor 30 comprises a piezoceramic or other device adaptable as such. Other sensing devices preferably include a manifold pressure sensor for monitoring manifold pressure (MAP) and ambient barometric pressure (BARO), a mass air flow sensor for monitoring intake mass air flow (MAF) and intake air temperature ($T_{IN}$), and, a coolant sensor 35 (COOLANT). The system may include an exhaust gas sensor (not shown) for monitoring states of one or more exhaust gas parameters, e.g., temperature, air/fuel ratio, and constituents. One having ordinary skill in the art understands that there may other sensing devices and methods for purposes of control and diagnostics. The operator input, in the form of the operator torque request, $T_{O\_REQ}$, is typically obtained through a throttle pedal and a brake pedal, among other devices. The engine is preferably equipped with other sensors (not shown) for monitoring operation and for purposes of system control. Each of the sensing devices is signally connected to the control module 5 to provide signal information which is transformed by the control module to information representative of the respective monitored parameter. It is understood that this configuration is illustrative, not restrictive, including the various sensing devices being replaceable with functionally equivalent devices and algorithms.

The actuators are installed on the engine and controlled by the control module 5 in response to operator inputs to achieve various performance goals. Actuators include an electronically-controlled throttle device which controls throttle opening to a commanded input (ETC), and a plurality of fuel injectors 12 for directly injecting fuel into each of the combustion chambers in response to a commanded input (INJ_PW), all of which are controlled in response to the operator torque request ($T_{O\_REQ}$). There is an exhaust gas recirculation valve 32 and cooler (not shown), which controls flow of externally recirculated exhaust gas to the engine intake, in response to a control signal (EGR) from the control module. The glow-plug 28 comprises a known device, installed in each of the combustion chambers, adapted for use with the combustion pressure sensor 30.

The fuel injector 12 is an element of a fuel injection system, which comprises a plurality of high-pressure fuel injector devices each adapted to directly inject a fuel charge, comprising a mass of fuel, into one of the combustion chambers in response to the command signal, INJ_PW, from the control module. Each of the fuel injectors 12 is supplied pressurized fuel from a fuel distribution system (not shown), and have operating characteristics including a minimum pulsewidth and an associated minimum controllable fuel flow rate, and a maximum fuel flowrate.

The engine may be equipped with a controllable valvetrain operative to adjust openings and closings of intake and exhaust valves of each of the cylinders, including any one or more of valve timing, phasing (i.e., timing relative to crank angle and piston position), and magnitude of lift of valve openings. One exemplary system includes variable cam phasing, which is applicable to compression-ignition engines, spark-ignition engines, and homogeneous-charge compression ignition engines.

The control module 5 is preferably includes one or more general-purpose digital computers generally comprising a microprocessor or central processing unit, storage mediums comprising non-volatile memory including read only memory (ROM) and electrically programmable read only memory (EPROM), random access memory (RAM), a high speed clock, analog to digital (A/D) and digital to analog (D/A) circuitry, and input/output circuitry and devices (I/O) and appropriate signal conditioning and buffer circuitry. The control module has a set of control algorithms, comprising resident program instructions and calibrations stored in the non-volatile memory and executed to provide the respective functions of each computer. The algorithms are typically executed during preset loop cycles such that each algorithm is executed at least once each loop cycle. Algorithms are executed by the central processing unit and are operable to monitor inputs from the aforementioned sensing devices and execute control and diagnostic routines to control operation of the actuators, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

The control module 5 executes algorithmic code stored therein to control the aforementioned actuators to control engine operation, including throttle position, fuel injection mass and timing, EGR valve position to control flow of recirculated exhaust gases, glow-plug operation, and control of intake and/or exhaust valve timing, phasing, and lift, on systems so equipped. The control module is adapted to receive input signals from the operator (e.g., a throttle pedal position and a brake pedal position) to determine the operator torque request, $T_{O\_REQ}$, and from the sensors indicating the engine speed (RPM) and intake air temperature ($T_{IN}$), and coolant temperature and other ambient conditions.

Combustion occurring within the engine is difficult to directly monitor. Sensors may detect and measure fuel flow and air flow into the cylinder, a sensor may monitor a particular voltage being applied to a spark plug, input values such as programmed start of injection (SOI) or programmed ignition timing may be known, or a processor may gather a sum of information that would predict conditions necessary to generate an auto-ignition, but these readings and data point together are merely predictive of combustion and do not measure actual combustion results. Cylinder pressure readings provide tangible readings describing conditions within the combustion chamber. Based upon an understanding of the combustion process, cylinder pressures may be analyzed to estimate the state of the combustion process within a particular cylinder, describing the combustion in terms of both combustion phasing and combustion strength. Combustion of a known charge at known timing under known conditions produces a predictable pressure within the cylinder. By describing the phase and the strength of the combustion at certain crank angles, the initiation and the progression of a particular combustion cycle may be described as an estimated state of combustion. By estimating the state of the combustion process for a cylinder and comparing the state to expected cylinder readings, cylinders may be evaluated in terms of malfunctions, misfires, or inefficient operation. Such evaluations may be especially important in engines operating under HCCI or compression ignition, as small variations in cylinder conditions can interfere with conditions necessary to create efficient and orderly auto-ignition necessary to derive the benefits of efficiency, fuel economy, and low emissions evident in a properly functioning engine.

Figure 2:
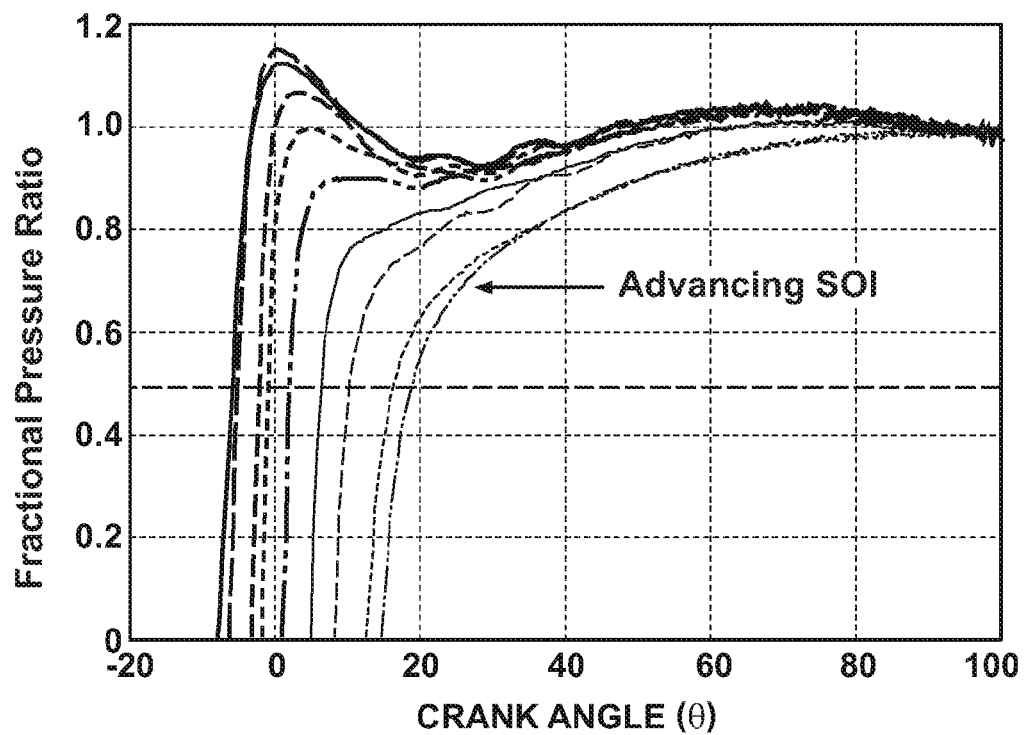
FIG. 2 is a graphical depiction of multiple resulting combustion phase curves as a result of changing start of injection crank angles in accordance with an exemplary embodiment of the disclosure.

One method for evaluating combustion phasing includes processing cylinder pressure transducer readings and comparing combustion phasing information determined from the pressure readings. Injection timing within a compression ignition engine is a controlling factor in combustion phasing. Under otherwise static or stable engine conditions (with fixed EGR and air to fuel ratio), modulating the SOI will have predictable results in combustion phasing. FIG. 2 illustrates combustion phasing measured at a fractional pressure ratio (FPR) of 0.5 across a range of SOI values in accordance with the disclosure. Each plot depicted represents fractional pressure ratio within a combustion chamber through a combustion cycle at various selected SOI crank angles. The plots show that as SOI advances, the crank angle at which the FPR reaches 0.5 advances.

FPR is a known measure of how much of pressure rise attributable to combustion has occurred by a particular crank angle. FPR is useful to estimate mass fraction burn or the percentage of charge which has been combusted within the combustion chamber by a particular crank angle. FPR may be calculated in a number of methods known in the art. For example, one method to calculate FPR is to integrate a measure of pressure within the combustion chamber from the start of combustion to some measured point, and then normalize or scale that integral to the total pressure rise expected due to combustion. This yields an FPR between 0 and 1 quantifying the progress of the combustion process. Another method for computing FPR is performed through the following equation:

$$FPR = \frac{PR(\theta) - 1}{PR(90°) - 1} = \frac{\left(\frac{P_{CYL}(\theta)}{P_{MOT}(\theta)} - 1\right)}{PR(90°) - 1} \quad [1]$$

$$= \frac{\left(\frac{NCP(\theta)}{P_{MOT}(\theta)}\right)}{\frac{NCP(\text{complete\_combustion})}{P_{MOT}(\text{complete\_combustion})}}$$

Figure 3:
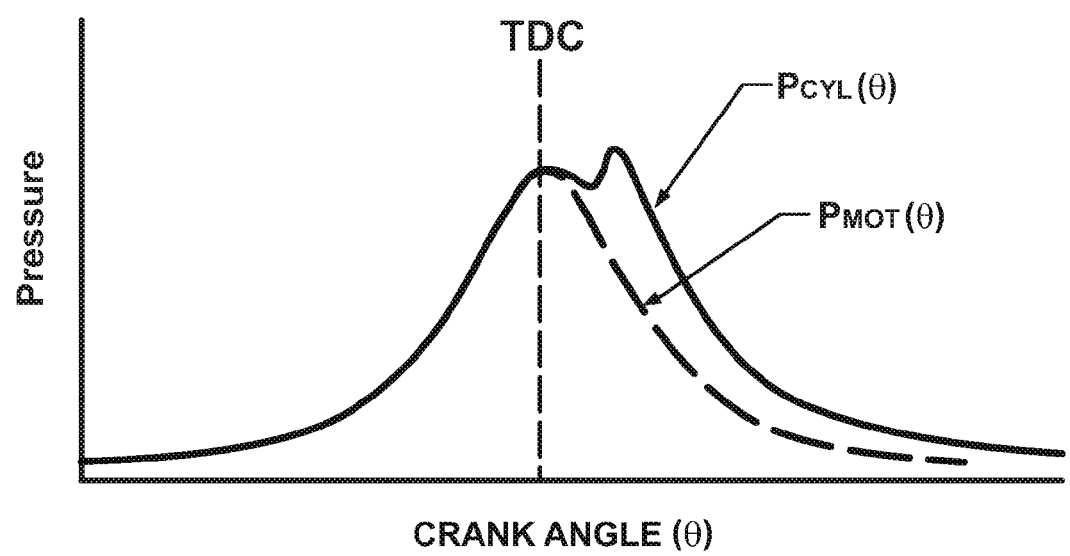
FIG. 3 is a graphical depiction of exemplary pressures observable within a combustion chamber during a compression/expansion event, including cylinder pressure common to a combustion cycle and motored pressure common to a cylinder cycled without combustion, in accordance with the disclosure.

Terms related to FPR are illustrated in FIG. 3, an exemplary graph of pressures within a combustion chamber through a combustion cycle in accordance with the disclosure. $P_{CYL}(\theta)$ equals the pressure measured by a pressure transducer at some crank angle $\theta$. $P_{CYL}(\theta)$ includes a portion of pressure rise attributable to combustion and a portion of pressure rise attributable to the compression force of the piston. $P_{MOT}(\theta)$ equals the theoretical pressure which would exist in the combustion chamber due to the compressive force of the piston at crank angle $\theta$ if no combustion took place in the cylinder. $NCP(\theta)$ or net combustion pressure equals the difference between $P_{CYL}(\theta)$ and $P_{MOT}(\theta)$ or the pressure rise in the combustion chamber attributable to combustion at a given crank angle. $PR(\theta)$ equals the ratio of $P_{CYL}(\theta)$ to $P_{MOT}(\theta)$ and yields a fraction describing the total pressure in the chamber to the pressure that would exist without combustion. Because $P_{CYL}$ includes $P_{MOT}$ plus NCP, PR as an ideal term (neglecting heat loss) will always be greater than one. By subtracting one from PR, $P_{CYL}/P_{MOT}$ may be transformed to $NCP/P_{MOT}$, thereby directly describing the pressure rise due to combustion. $PR(\theta)$ minus one divided by PR at ninety degrees (90°) minus one yields a measure of the current pressure rise attributable to combustion to a total expected pressure rise attributable to combustion. A crank angle of 90° is selected to compare to crank angle $\theta$ because combustion of the charge at 90° is substantially complete and all valves remain closed, maintaining the relationship of pressures within the combustion chamber as a closed system. PR(90°) is a projected or estimated value entered or calculated for given engine conditions.

Figure 4:
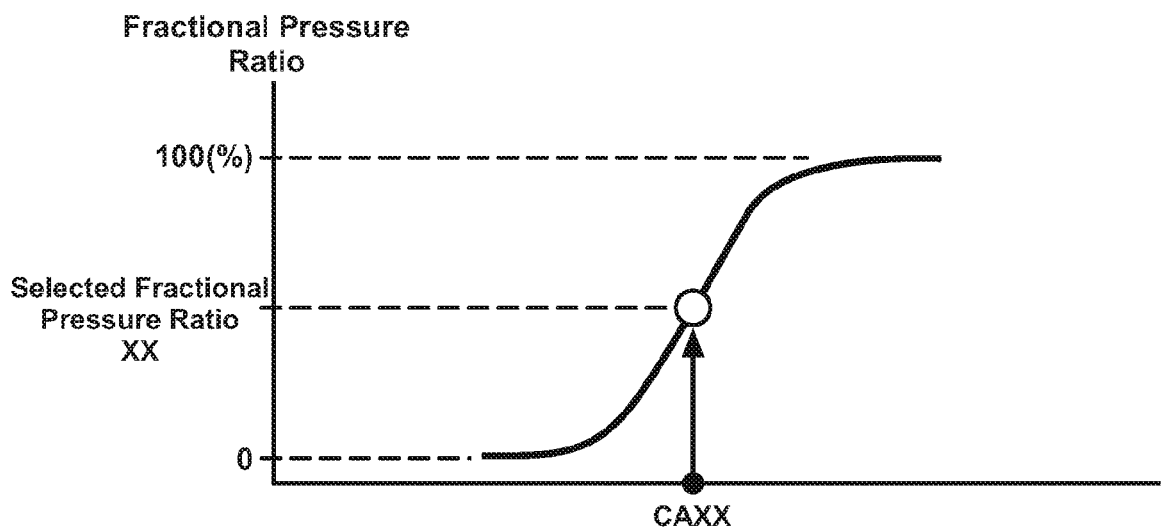
FIG. 4 is a graphical depiction of an exemplary fractional pressure ratio curve in accordance with the disclosure.

An exemplary FPR curve is illustrated in FIG. 4, depicting the ratio of $PR(\theta)$ to $PR(90°)$ over a combustion cycle, in accordance with the disclosure. At some beginning crank angle, none of the charge has been combusted and no pressure rise attributable to combustion has occurred. As the charge begins to combust, the combustion creates pressure in the combustion chamber and the pressure rise attributable to combustion increases. By some crank angle, the majority of charge is combusted and combustion slows, and the pressure rise attributable to combustion tapers off. The comparison of pressures at θ to pressures at 90° yields a measure of the pressure attributable to combustion at a crank angle as a fraction of the total pressure to be created in the complete cycle. Because this pressure rise is directly attributable to combustion, understanding the pressure measurement leads to understanding the combustion state or combusting phasing. By identifying a particular crank angle at which the combustion reaches a certain FPR utilized as a set metric to evaluate the combustion process to an expected combustion process, especially an FPR measure indicative of a significant stage of combustion such as is indicated by the steep curve on FIG. 4 at 50% in FIG. 4, combustion phasing for that combustion cycle may be evaluated. For various reasons known in the art, different selected FPRs may be preferably used as the set metric to compare different combustion events. In an average combustion process, the combustion within the combustion chamber will begin relatively slowly, then progress relatively quickly through the available charge, then slowly burn away residual charge. For this reason, FPRs though the middle of the combustion process, for instance FPR between 0.3 and 0.7, provide the greatest resolution for evaluating the progression of the combustion process.

Pressure readings from the pressure transducers located in or in communication with the combustion cylinders contain information directly related to the combustion occurring within the combustion chamber. However, engines are very complex mechanisms, and these pressure readings can contain, in addition to a measure of $P_{CYL}(\theta)$, a multitude of pressure oscillations from other sources. Fast Fourier Transforms (FFTs) are mathematical methods well known in the art. One FFT method known as spectrum analysis analyzes a complex signal and separates the signal into its component parts which may be represented as a sum of harmonics. Spectrum analysis of a pressure transducer signal represented by $f(\theta)$ may be represented as follows:

$$FFT(f(\theta))=A_0+(A_1 \sin(\omega_0\theta+\phi_1))+(A_2 \sin(2\omega_0\theta+\phi_2))+\ldots+(A_N \sin(N\omega_0\theta+\phi_N)) \quad [2]$$

Each component N of the signal $f(\theta)$ represents a periodic input on the pressure within the combustion chamber, each increasing increment of N including signals or higher frequency. Experimental analysis has shown that the pressure oscillation caused by combustion and the piston moving through the various stages of the combustion cycle, $P_{CYL}(\theta)$, tends to be the first, lowest frequency harmonic. By isolating this first harmonic signal, $P_{CYL}(\theta)$ can be measured and evaluated. As is well known in the art, FFTs provide information regarding the magnitude and phase of each identified harmonic, captured as the φ term in each harmonic of the above equation. The angle of the first harmonic, or φ1, is, therefore, the dominant term tracking combustion phasing information. This combustion phasing value, tracked as φ1, can be used to track the behavior of the combustion process, yielding, for example, a net combustion pressure phasing value describing the behavior of the net combustion pressure in relation to the progression of the combustion cycle. By analyzing the component of the FFT output related to PCYL, the phasing information of this component can be quantified and compared to either expected phasing or the phasing of other cylinders. This comparison allows for the measured phasing values to be evaluated and a warning indicated if the difference is greater than a threshold phasing difference, indicating combustion issues in that cylinder.

Signals analyzed through FFTs are most efficiently estimated when the input signal is at steady state. Transient effects of a changing input signal can create errors in the estimations performed. While methods are known to compensate for the effects of transient input signals, the methods disclosed herein are preferably performed at either idle or steady, average engine speed conditions in which the effects of transients are substantially eliminated. One known method to accomplish the test in an acceptably steady test period is to take samples and utilize an algorithm within the control module to either validate or disqualify the test data as being taken during a steady period of engine operation.

It should be noted that although the test data is preferably taken at idle or steady engine operation, information derived from these analyses can be utilized by complex algorithms or engine models to effect more accurate engine control throughout various ranges of engine operation. For example, if testing and analysis at idle shows that cylinder number four has a partially clogged injector, fuel injection timing could be modified for this cylinder throughout different ranges of operation to compensate for the perceived issue.

Returning to FIG. 2, in this exemplary embodiment of the analysis, FPR provides a means to evaluate combustion phasing of different combustion cycles with a common metric of combustion. Other metrics could be picked instead of FPR equaling 50% (0.5), for instance, FPR equaling 30%, or other metrics indicative of the progression of combustion, such as mass fraction burn %, so long as the same metric of combustion is used to the compare the various combustion cycles. By picking equivalent or set metrics of combustion, different combustion cycles can be compared for phasing information. The points on each line intersecting a Y value denoting FPR equals 0.5 estimate a crank angle at which 50% of the charge in the combustion chamber has been combusted. It can be seen that incremental advances to SOI generate an orderly advance to combustion timing measured at FPR equals 0.5.

Figure 5:
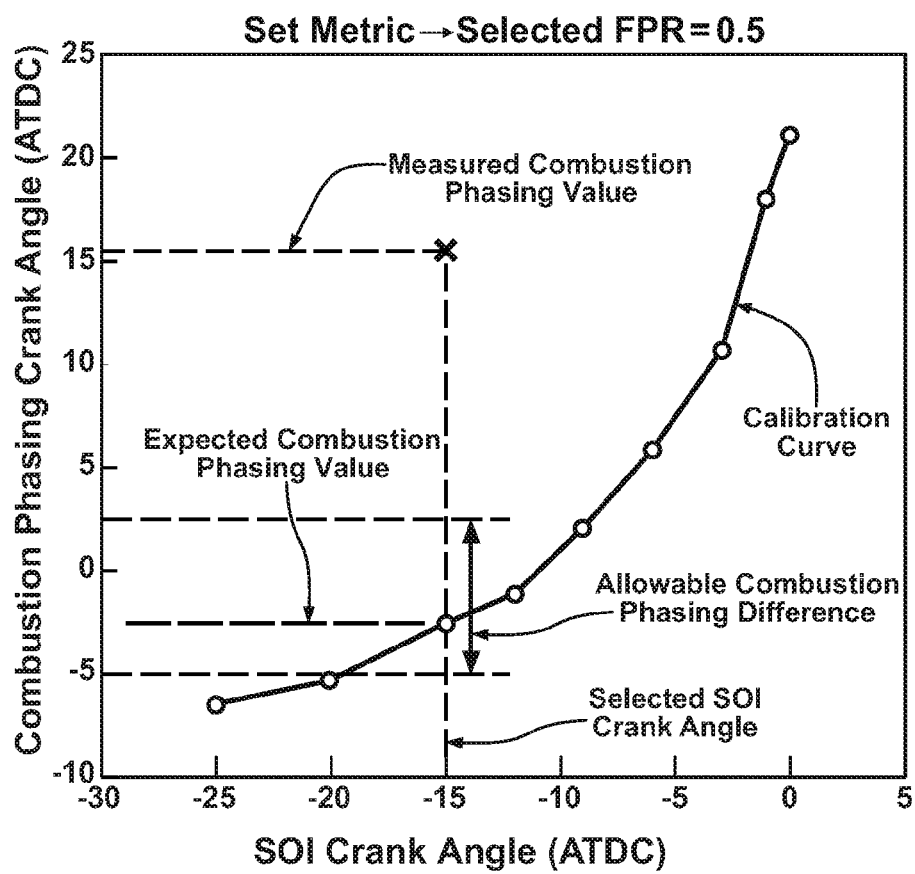
FIG. 5 is a graphical depiction of an exemplary combustion phasing calibration curve, displaying SOI crank angles and resulting combustion phasing values, in accordance with the disclosure.

FIG. 5 demonstrates a calibration curve, depicting SOI values versus resulting expected combustion phasing values evaluated at a metric of FPR equaling 0.5, generated by changing SOI values in an engine operating under otherwise static engine conditions and embodying an exemplary method to diagnose combustion, in accordance with the disclosure. Such a curve may be developed experimentally, empirically, predictively, through modeling or other techniques adequate to accurately predict engine operation, and a multitude of calibration curves might be used by the same engine for different engine settings, conditions, or operating ranges. For any selected SOI crank angle value, points are plotted giving expected combustion phasing values corresponding to crank angles where FPR equals 0.5. For example, this exemplary graph predicts for a programmed SOI of minus fifteen degrees, the resulting FPR in the combustion chamber will reach 0.5 at approximately minus two and a half degrees. This calibration curve is useful in coordination with an allowable combustion phasing difference to judge whether measured combustion phasing values, for a selected or programmed SOI value in the engine controller, is within normal operation tolerances for the current combustion cycle. In the exemplary curve displayed, an allowable combustion phasing difference is defined as plus five degrees and minus three degrees. A measured fractional pressure ratio value for the programmed SOI crank angle, generated by the method described above from measured cylinder pressure or by other known methods, is compared with the selected fractional pressure ratio and allowable combustion phasing difference at that SOI crank angle, and a warning is generated if the value falls outside of the allowable difference. In this exemplary graph, a measured combustion phasing crank angle where FPR equals 0.5, in a combustion cycle where SOI is programmed at minus fifteen degrees, is measured at approximately sixteen degrees. This measured combustion phasing value is outside of the allowable combustion phasing difference, so a warning indication is appropriate. The allowable combustion phasing difference may be the same value in the positive and negative, or as in this exemplary graph, the values may differ for values greater and less than the expected combustion phasing value. Additionally, different allowable combustion phasing differences may be defined for different SOI ranges or specific values. Additionally the allowable combustion phasing differences may modulate based upon other engine conditions or measured parameters. For example, an engine operating under spark-assist ignition may have tighter allowable combustion phasing differences than an engine operating under compression ignition.

The above method utilizes a measured combustion phasing value to diagnose combustion. This measured combustion phasing value is derived from engine data describing the effects of combustion within the combustion chamber as a function of crank angle. As mentioned above, judging information from raw pressure transducer readings is difficult, and FFTs are one method known in the art to reduce complex signals into usable information. For example, the measured combustion phasing value displayed in FIG. 5 displays an output associated with an exemplary equation:

$$\phi = \text{angle}(\text{FFT}(P_{cyl}(\theta)), \theta = [-20° \ 20°]) \quad [3]$$

The output of the application of this FFT yields phase information regarding $P_{CYL}(\theta)$ and can then be utilized to generate a measured combustion phasing value such as the point denoted by the "X" at 16 degrees in FIG. 5 for comparison to the expected combustion phasing value. In this way, the waveform generated by the FFT applied to pressure transducer readings yields a real-time measurement that can be utilized to diagnose the combustion cycle.

Many factors are utilized to select the allowable combustion phasing difference values. The range of values allowable must be large enough to allow for normal deviation in combustion phasing resulting from normal variations in engine operation, resulting from changing conditions such as temperature, fuel type, vehicle maintenance history, and changes in throttle setting or vehicle load. However, the range of values allowable must be small enough to identify significant cylinder malfunctions. Although testing is preferably performed at idle or steady engine operation, use in transient conditions can be accomplished by adding some modifier or applying an algorithm to the allowable combustion phasing difference values to accommodate changes expected in the transition. For example, if acceleration by a particular increase in throttle in a certain zone of engine operation is known to command a certain SOI timing, anticipation of the engine operating in this zone based upon current conditions, historical driver habits (for example, if the driver frequently accelerates at a particular point on the road), GPS information, etc. could be used to adjust allowable combustion phasing difference values to compensate. The range of allowable combustion phasing difference values will differ from application to application and may be determined experimentally, empirically, predictively, through modeling or other techniques adequate to accurately predict engine operation.

Other embodiments of comparison may be utilized to employ the methods disclosed herein. In the method described above regarding FIG. 5, the exemplary calibration curve shown defines an allowable combustion phasing difference for a particular SOI, measures a combustion phasing value, and compares the allowable difference to the measured value to determine whether a warning is appropriate. The same calibration curve as is illustrated in FIG. 5 could be used alternatively, for example, by measuring a combustion phasing value, estimating an SOI crank angle from the measured combustion phasing value by the points on the calibration curve, and then comparing the estimated or measured SOI crank angle to a selected SOI crank angle. A warning is indicated if the measured SOI crank angle differs from the selected SOI crank angle by more than an allowable difference. Although the actual comparison performed in this method is different from the above described method of FIG. 5, both use the same overall method, comparing measured combustion phasing to predicted combustion phasing for a given SOI, and the specific means of comparing combustion phasing values are not intended to be limited to the embodiments described herein. In comparing crank angles, the allowable difference utilized in the comparison would be developed and adjust similarly to the methods described above to define the allowable phasing difference in aforementioned exemplary embodiments.

Figure 6:
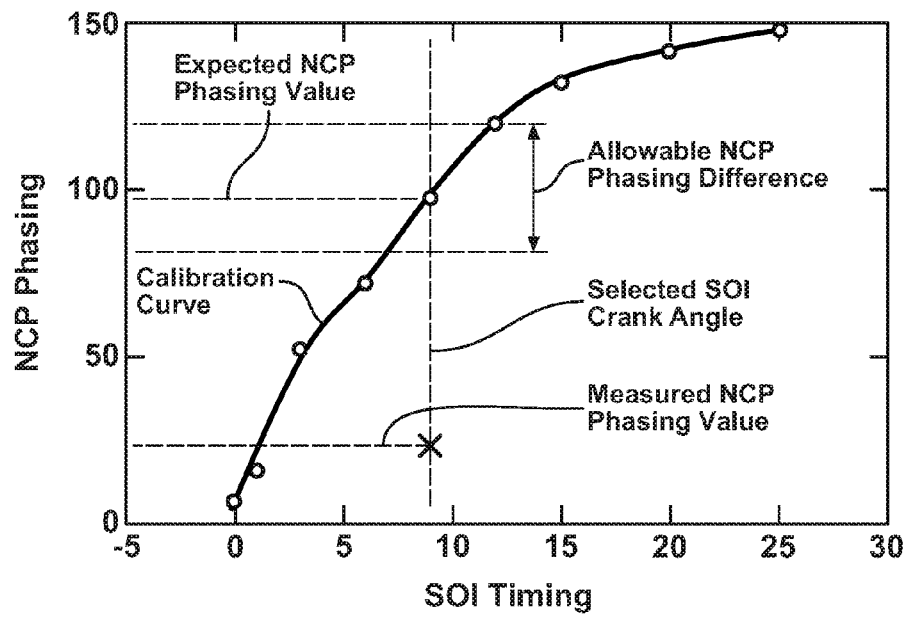
FIG. 6 is a graphical depiction of an exemplary net combustion pressure phasing calibration curve, displaying SOI crank angles and resulting net combustion pressure phasing values, in accordance with the disclosure.

The above methods are not the only measure of combustion phasing which may be utilized to evaluate combustion. Any measure of the combustion cycle displaying direct results of the combustion of charge may be utilized to evaluate combustion phasing. For example, NCP(θ), the difference between $P_{CYL}(\theta)$ and $P_{MOT}(\theta)$, is the pressure rise in the combustion chamber attributable to combustion. NCP phasing can be developed by applying FFT to NCP. FIG. 6 illustrates the use of changes in NCP phasing resulting from SOI changes to evaluate measured NCP phasing data in accordance with the disclosure. NCP phasing value such as are shown on this exemplary graph may be generated by an output associated with an exemplary equation:

$$\phi = \text{angle}(\text{FFT}(\text{NCP}(\theta), \theta = [-20° \ 20°])) \quad [4]$$

The output the application of this FFT yields phase information regarding NCP(θ) and can be utilized to generate a NCP phasing value such as the point denoted by the "X" at 20 degrees in FIG. 6 for comparison to the expected NCP phasing value. In this way, the waveform generated by the FFT applied to NCP readings yields a real-time measurement that can be utilized to diagnose the combustion cycle. Additionally, as in discussion of FIG. 5, the use of the calibration curve illustrated in FIG. 6 may be performed alternatively by acquiring the NCP phasing value, estimating a measured SOI crank angle from the NCP phasing value based on calibration data, and comparing the measured SOI crank angle to a set or selected SOI crank angle. Through whatever method, measured combustion phasing values may be compared to a calibrated or calculated expected combustion phasing to evaluate combustion issues in a particular combustion chamber.

Figure 7:
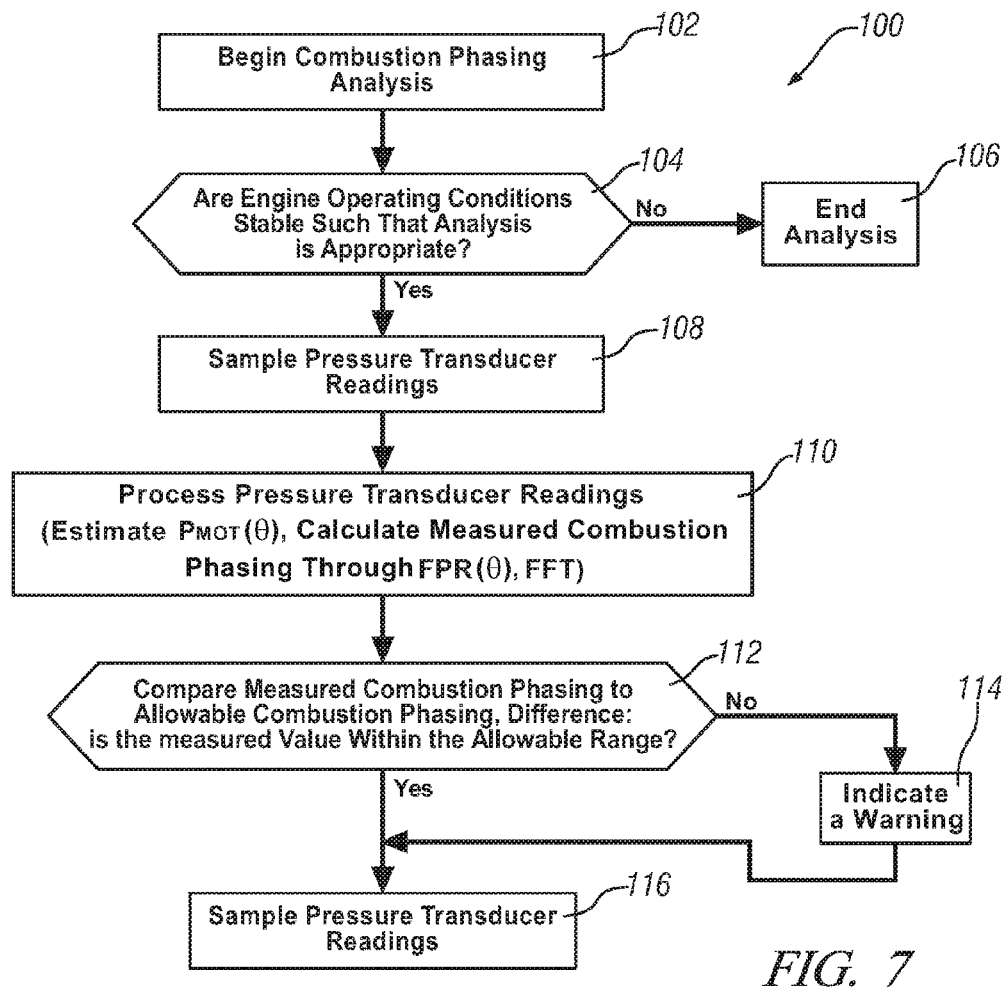
FIG. 7 is a flowchart illustrating an exemplary process utilizing a method described in accordance with the disclosure.

One method to utilize $P_{CYL}(\theta)$ to measure combustion phasing and indicate combustion issues is illustrated in FIG. 7 as process 100 in accordance with the disclosure. A combustion phasing analysis is initiated at step 102. Initiation may be performed periodically, in response to some event such as engine startup or as a result of some sensor reading indicating possible combustion issues, or as a result of a diagnostic prompt. At step 104, engine operating conditions are analyzed to determine whether conditions are stable enough to allow a comparison of combustion phasing based on a programmed SOI value. The criteria for determining stability will be different from application to application and may be determined experimentally, empirically, predictively, through modeling or other techniques adequate to accurately predict engine operation. If engine operating conditions are not stable enough to perform the comparison, then the analysis is ended at step 106. If engine operating conditions are stable, then pressure transducer readings are sampled across a range of crank angles at step 108. The pressure transducer readings are processed at step 110 by methods in accordance with in this disclosure to generate a measured combustion phasing value. This measured combustion phasing value is compared to the allowable combustion phasing difference in step 112. If the measured combustion phasing value is determined to be within the allowable range determined by the allowable combustion phasing difference, then no warning is generated. If the measured combustion phasing value is determined to be outside of the allowable range determined by the allowable combustion phasing difference, then a warning is generated at step 114. The analysis is then ended at step 116.

Warnings issued due to an identified combustion issue or faulty cylinder may take many forms, including but not limited to a warning light indication, an audible tone or message, a display on a driver interface device, or a message relayed over a communications network. Alternatively, error messages or fault tallies not deemed to be critical could be recorded in a memory storage device, preferably communicably connected to or unitary with the above mentioned control module 5, for review by maintenance personnel without alerting the driver.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for diagnosing combustion within an engine operative lean of stoichiometry and in a compression ignition range including a cylinder having a variable volume combustion chamber defined by a piston reciprocating therein between top-dead-center and bottom-dead-center points and a cylinder head, said method comprising:
   monitoring pressure from said cylinder during a combustion cycle;
   generating a measured combustion phasing value for said cylinder at a predetermined metric selected to index said combustion cycle based on a Fast Fourier Transform of said monitored pressure;
   comparing said measured combustion phasing value to an expected combustion phasing value based on a selected start of injection crank angle at said predetermined metric; and
   identifying combustion phasing differences greater than an allowable combustion phasing difference based on said comparing.

2. The method of claim 1, wherein:
   said predetermined metric comprises a selected fractional pressure ratio; and
   said generating said measured combustion phasing value includes
      processing said monitored pressure by spectral analysis utilizing said Fast Fourier Transform to identify a waveform comprising a first harmonic waveform associated with a cylinder pressure component of said monitored pressure;
      calculating a phase component of said waveform; and
      selecting a measured combustion phasing value from said phase component wherein a measured fractional pressure ratio equals said predetermined fractional pressure ratio.

3. The method of claim 2, wherein said predetermined fractional pressure ratio is between about 0.3 and 0.7.

4. The method of claim 2, wherein said predetermined fractional pressure ratio equals 0.5.

5. The method of claim 2, wherein:
   said measured fractional pressure ratio is calculated by determining a ratio of a measured pressure ratio at a crank angle minus one to an estimated complete combustion pressure ratio minus one;
   said measured pressure ratio is calculated as a cylinder pressure measured at said crank angle divided by an estimated motored pressure at said crank angle; and
   said estimated complete combustion pressure ratio is estimated as an estimated cylinder pressure at ninety degrees post top dead center divided by an estimated motored pressure at ninety degrees post top dead center.

6. The method of claim 1, wherein:
   said predetermined metric comprises a selected fractional pressure ratio;
   said generating said measured combustion phasing value comprises generating a net combustion pressure phasing value; and
   said generating said net combustion pressure phasing value includes
      processing said monitored pressure by spectral analysis utilizing said Fast Fourier Transform to identify a waveform comprising a first harmonic waveform associated with a cylinder pressure component of said monitored pressure,
      processing said waveform to calculate a net combustion pressure,
      utilizing a second Fast Fourier Transform to calculate a phase component of said net combustion pressure, and
      selecting from said phase component of said net combustion pressure said net combustion pressure phasing value wherein a measured fractional pressure ratio equals said predetermined fractional pressure ratio.

7. The method of claim 6, wherein said predetermined fractional pressure ratio is between about 0.3 and 0.7.

8. The method of claim 6, wherein said selected fractional pressure ratio equals 0.5.

9. The method of claim 6, wherein:
   said measured fractional pressure ratio is calculated by determining a ratio of a measured pressure ratio at a crank angle minus one to an estimated complete combustion pressure ratio minus one;
   wherein said measured pressure ratio is calculated as a cylinder pressure measured at said crank angle divided by an estimated motored pressure at said crank angle; and
   wherein said estimated complete combustion pressure ratio is estimated as an estimated cylinder pressure at ninety degrees post top dead center divided by an estimated motored pressure at ninety degrees post top dead center.

10. The method of claim 6, wherein said measured fractional pressure ratio is calculated by integrating said net combustion pressure from a start of said combustion cycle to a crank angle and scaling said integral between zero and one to estimate said measured fractional pressure ratio.

11. The method of claim 1, wherein said comparing said measured combustion phasing value to said expected combustion phasing value includes estimating said expected combustion phasing value based on modeled combustion chamber operation.

12. The method of claim 1, wherein said comparing said measured combustion phasing value to said expected combustion phasing value includes determining said expected combustion phasing value with calibration data.

13. A method for diagnosing combustion within an engine operative lean of stoichiometry and in a compression ignition range including a cylinder having a variable volume combustion chamber defined by a piston reciprocating therein between top-dead-center and bottom-dead-center points and a cylinder head, said method comprising:
monitoring pressure from said cylinder during a combustion cycle;
generating a measured start of injection crank angle on the basis of said monitored pressure, wherein said measured start of injection crank angle is calculated utilizing a Fast Fourier Transform to generate a measured combustion phasing value and processing said measured combustion phasing value to estimate said measured start of injection crank angle;
comparing said measured start of injection crank angle to a predetermined start of injection crank angle; and
identifying start of injection crank angle differences greater than an allowable start of injection crank angle difference based on said comparing.

14. The method of claim 13, wherein said utilizing said Fast Fourier Transform to generate said measured combustion phasing value comprises:
processing said pressure transducer data by spectral analysis utilizing said Fast Fourier Transform to identify a waveform comprising a first harmonic waveform associated with a cylinder pressure component of said monitored pressure;
calculating a phase component of said waveform; and
selecting a measured combustion phasing value from said phase component wherein a measured fractional pressure ratio equals a predetermined fractional pressure ratio;
wherein said processing said measured combustion phasing value to estimate said measured start of injection crank angle comprises utilizing calibration data and said measured combustion phasing value to estimate said measured start of injection crank angle.

15. The method of claim 14, wherein said measured fractional pressure ratio is calculated by determining a ratio of a measured pressure ratio at a crank angle minus one to an estimated complete combustion pressure ratio minus one, wherein said measured pressure ratio is calculated as a cylinder pressure measured at said crank angle divided by an estimated motored pressure at said crank angle and wherein said estimated complete combustion pressure ratio is estimated as an estimated cylinder pressure at ninety degrees post top dead center divided by an estimated motored pressure at ninety degrees post top dead center.

16. The method of claim 13, wherein said measured combustion phasing value equals a net combustion pressure phasing value and utilizing said Fast Fourier Transform to generate a measured combustion phasing value, includes:
processing said monitored pressure by spectral analysis utilizing said Fast Fourier Transform to identify a waveform comprising a first harmonic waveform associated with a cylinder pressure component of said monitored pressure;
calculating a net combustion pressure from said waveform;
utilizing a second Fast Fourier Transform to calculate a phase component of said net combustion pressure based on said waveform; and
selecting said net combustion pressure phasing value from said phase component wherein a measured fractional pressure ratio equals a predetermined fractional pressure ratio;
wherein said processing said measured combustion phasing value to estimate said measured start of injection crank angle comprises utilizing calibration data and measured combustion phasing value to estimate said measured start of injection crank angle.

17. The method of claim 16, wherein said measured fractional pressure ratio is calculated by determining a ratio of a measured pressure ratio at a crank angle minus one to an estimated complete combustion pressure ratio minus one, wherein said measured pressure ratio is calculated as a cylinder pressure measured at said crank angle divided by an estimated motored pressure at said crank angle and wherein said estimated complete combustion pressure ratio is estimated as an estimated cylinder pressure at ninety degrees post top dead center divided by an estimated motored pressure at ninety degrees post top dead center.

18. The method of claim 13, wherein said identifying start of injection crank angle differences includes issuing at least one of a visible warning, an audible warning, a message to a driver information system, a message over a communications network, and information for storage in a memory storage device.

19. A method for diagnosing combustion within an internal combustion engine, comprising:
monitoring pressure transducer data in a combustion chamber;
determining an expected combustion phasing value corresponding to a selected fractional pressure ratio for a selected start of injection angle;
processing said pressure transducer data utilizing a Fast Fourier Transform to identify a first-harmonic waveform;
utilizing said waveform to calculate a measured combustion phasing value comprising a crank angle whereat a measured fractional pressure ratio is equal to said selected fractional pressure ratio; and
indicating an abnormal combustion event if said measured combustion phasing value differs from said expected combustion phasing value by more than an allowable combustion phasing difference.

20. The method of claim 19, wherein utilizing said waveform comprises calculating said measured fractional pressure ratio across a range of crank angles, said calculating said measured fractional pressure ratio comprising:
iteratively determining at a subdivided crank angle within said range of crank angles said measured fractional pressure ratio as a ratio of a measured pressure ratio minus one to an estimated complete combustion pressure ratio minus one, wherein said measured pressure ratio is calculated as said waveform at said selected crank angle divided by an estimated motored pressure at said subdivided crank angle and wherein said estimated complete combustion pressure ratio is estimated as a cylinder pressure at ninety degrees post top dead center divided by a motored pressure at ninety degrees post top dead center.

* * * * *